UNITED STATES PATENT OFFICE.

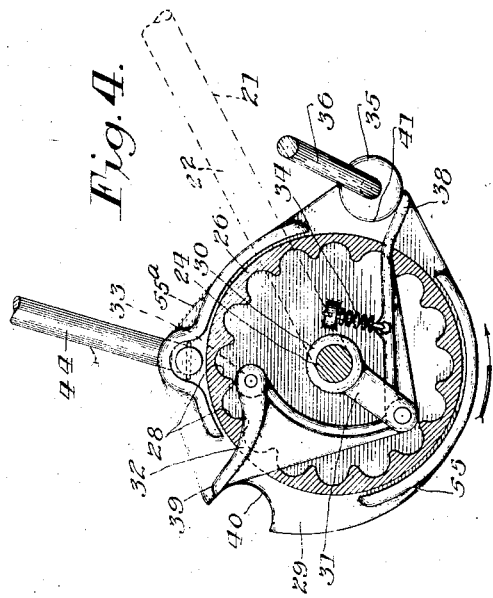

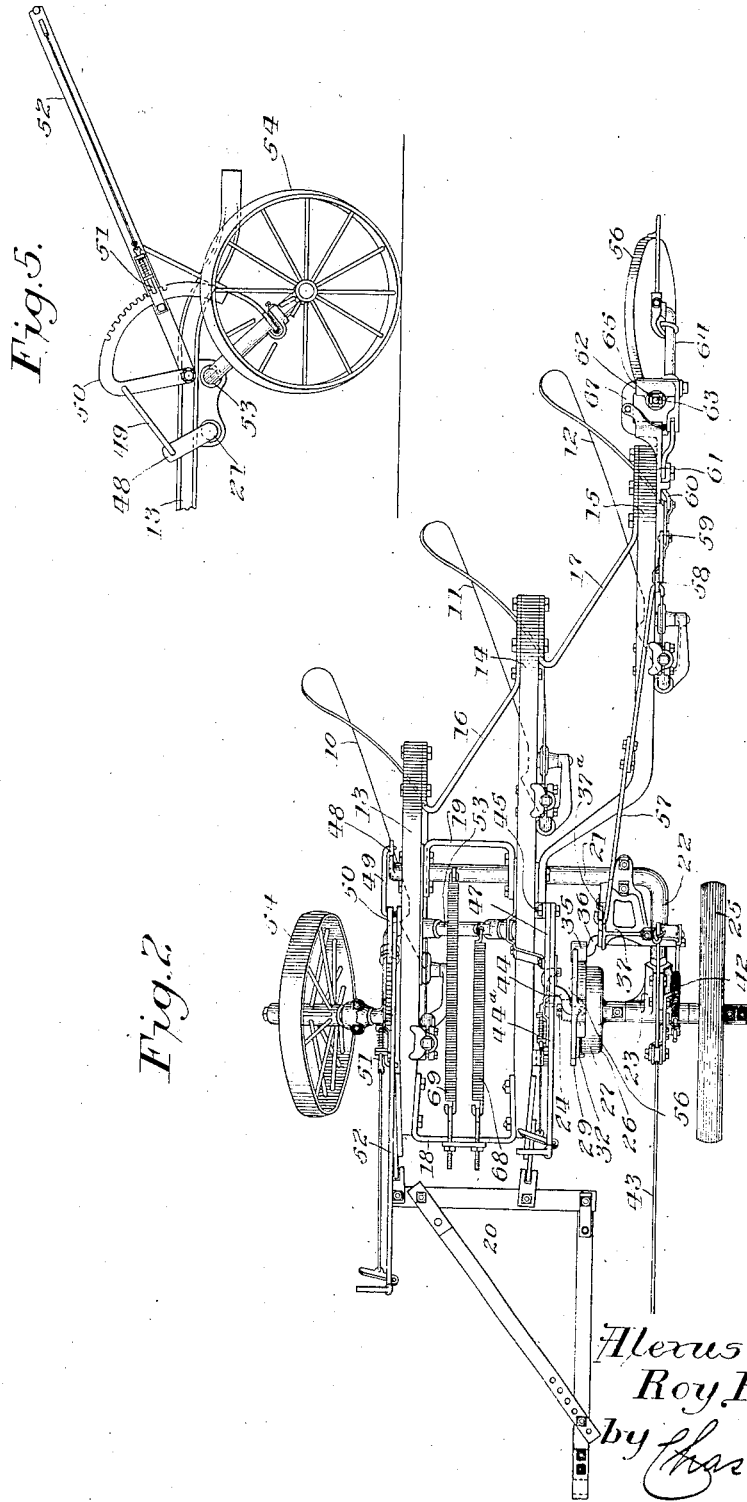

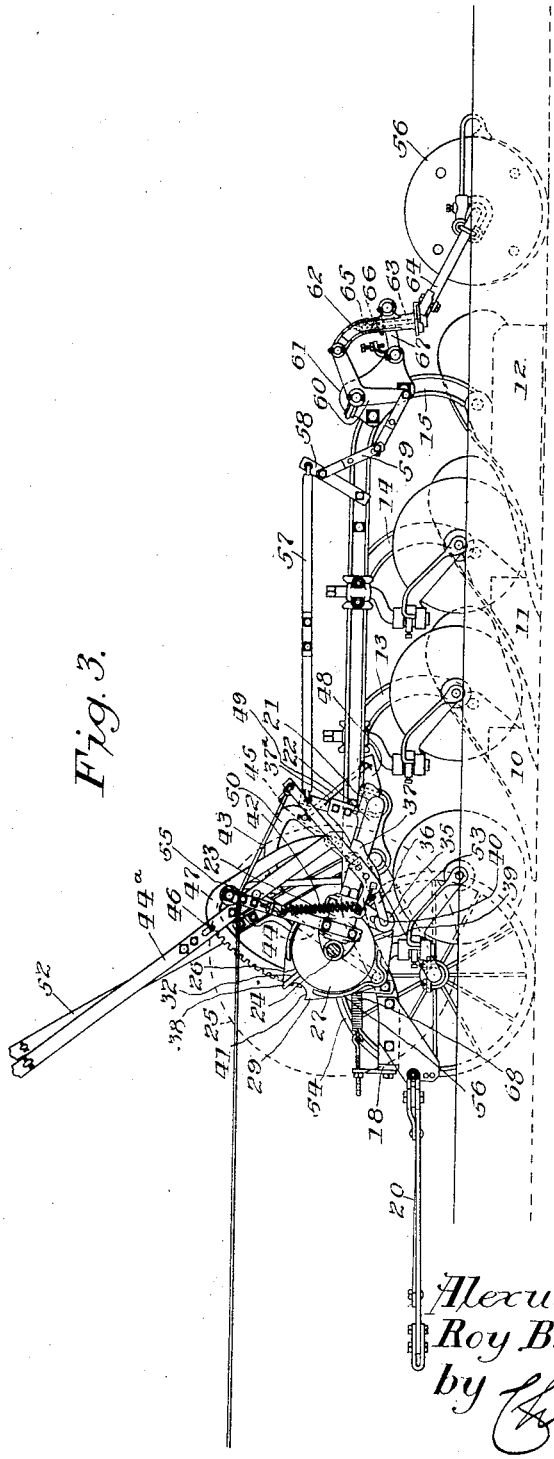

ALEXUS C. LINDGREN AND ROY B. JOHNSTON, OF HAMILTON, ONTARIO, CANADA, ASSIGNORS, BY MESNE ASSIGNMENTS, TO FRED GERLACH AND ARNOLD B. KELLER, TRUSTEES, BOTH OF CHICAGO, ILLINOIS.

POWER-LIFT PLOW.

1,394,914. Specification of Letters Patent. Patented Oct. 25, 1921.

Application filed November 19, 1917. Serial No. 202,782.

*To all whom it may concern:*

Be it known that we, ALEXUS C. LINDGREN and ROY B. JOHNSTON, citizens of the United States, and residents, respectively, of Hamilton, in the county of Wentworth and Province of Ontario, Dominion of Canada, and of Hamilton, in the county of Wentworth and Province of Ontario, Dominion of Canada, have invented certain new and useful Improvements in Power-Lift Plows, of which the following is a full, clear, and exact specification.

This invention relates to plows and more particularly to power lift plows.

The principal object of the invention is to improve the mechanism including the control parts for raising and lowering the frame and plow bases of a power lift plow.

Another object is to provide a simple, compact plow adapted to meet all the requirements for successful commercial operation.

Another object is to improve the raising mechanism of a power lift plow.

The invention is illustrated on the accompanying sheets of drawings, in which—

Figure 1 is a side elevation of our improved plow embodying various novel features, the plow shares being in a raised position;

Fig. 2 is a plan view of the same plow;

Fig. 3 is a side elevation of the same plow with the plow shares lowered into the ground;

Fig. 4 is a detail view showing the clutch arrangement whereby the raising and lowering of the plow is controlled; and, Fig. 5 is a partial side elevation showing the furrow-wheel and lever in detail.

The various novel features of our invention will be apparent from the following description and the drawings and will be particularly pointed out in the appended claims.

We have chosen to illustrate our invention in connection with a three-bottom plow or a plow having three plow bases 10, 11 and 12, respectively secured to beams 13, 14 and 15 which are connected at their rear ends by diagonal brace bars 16 and 17. The front ends of beams 13 and 14 are connected by a U-shaped bracket 18, and intermediate portions of the plow beams 13 and 14 are connected by a cross brace 19. The front end of the plow beam 15 is bent laterally and secured to an intermediate portion of the plow beam 14. Pivotally connected to the front end of the plow frame, which includes plow beams 13 and 14, is any suitable draft connection 20. Connected to the plow beams 13 and 14 for a rocking action with respect thereto is a crank shaft 21 having at one end thereof a forwardly and downwardly extending crank arm 22, whose function will be hereinafter explained. To the lower end of the crank arm is secured a bracket 23, journaled in which is a transversely extending power shaft 24, on one end of which is secured to rotate therewith a land side wheel 25.

Secured to the other end of the shaft 24 is the rotatable member 26 of a clutch 27 having internal notches 28 formed on a laterally extending flange portion thereof. Journaled on the power shaft 24 adjacent the rotatable clutch member is a dead or normally stationary clutch member 29 having a laterally extending collar portion 30 having an arm 31 to which is pivotally connected a pawl 32 having a roller 33 which is adapted to engage the notches 28 in the rotatable clutch member under the influence of a spring 34, for transmitting motion as hereinafter explained to the normally stationary clutch member 29. Normally, however, the roller 33 is held out of engagement with the notches 28 in the rotatable clutch member to prevent transmission of motion to the normally stationary clutch member 29 by a roller 35 mounted in one end of a lever 36 pivotally connected to a bracket 37 secured to the downwardly extending arm 22 of shaft 21.

The roller 35 when effective, that is to say, when it engages either end 38 or 39 of the pawl to hold the roller 33 out of engagement with the notches 28, also is retained in engagement with the pawl by resting in either of two notches 40 or 41 formed in the periphery of the normally stationary clutch member 29. These notches are spaced unequally for a purpose hereinafter explained. The roller 35 is normally yieldably retained in engagement with either of the notches 40 or 41 by a tension spring 42 which is anchored to an upright standard on crank arm 22 and is operatively connected to the lower end of the control lever 36. To the other end of the control lever 36 is secured a rope or cable 43, which passes through a suitable guide on the upper end of the standard and which is so associated with the lever 36 and spring 42 that when the cable is pulled by the operator, the roller 35 will be drawn out of engagement with one of the notches 40 or 41 against the tension of spring 42 to permit spring 34 to place the roller 33 of the pawl 32 into engagement with one of the notches 28 for transmitting motion from the live clutch member to the normally stationary clutch member.

This normally stationary clutch member is connected by a link 44 to a hand controlled lever 44ª, which is pivoted to the frame at 45 and has a detent 46 which normally locks the lever 44ª to a segment 47 secured to the frame of the plow.

The right-hand end of the shaft 21 is provided with an upstanding arm 48 which is connected by a link 49 to a segment 50, which is engaged by the detent 51 of a hand-operated lever 52, the latter of which is connected to a crank shaft 53, one end of which is provided with a furrow wheel 54 which normally runs in a furrow. The other end of the crank shaft 53 is parallel to the end carrying the furrow wheel, both being set at an angle to the shaft 21, and this shaft also is connected to the plow beams 13 and 14 for a rocking action with respect thereto.

In Fig. 3 of the drawings the plow shares are shown in a plowing position; that is, they are in the ground, and it will be noted that the depth levers are set for maximum depth and that the crank arm 22 of the crank shaft 21 extends almost horizontally forward with the land side wheel 25 in a somewhat elevated position with respect to the frame of the plow and also with respect to the plow bases. It will be seen that this construction permits the crank shafts at the forward end of the plow to be kept at such an angle to the vertical that the crank arms carrying the wheels will not be cramped and forced back under the plow frame. This is particularly true when the frame is raised as shown in Fig. 1. In that type of power lift plow having a crank which is nearly vertical in the raised position of the plow, the tendency to cramp the power wheel under the frame is so great that in many instances the plow will not lower while it is being moved forward even when the power clutch is thrown in. This tendency is increased by soft or rough ground. The furrow wheel 54 and its associated parts are in a corresponding position. However, it will be noted that the furrow wheel 54 operates in the last made furrow of the previous trip.

To raise the plow frame from the position shown in Fig. 3 to that of Fig. 1, the operator pulls upon the rope or cable 43 and the roller 35 passes out of one of the notches 40 or 41 in which it is engaged and permits the roller 33 to engage any of the notches 28, and the relatively stationary clutch member rotates with the wheel 25. The notches 40 and 41 on the stationary member 29 are spaced unequally so that they will fall at points located so that the pawl roller 33 will disengage in all positions of the adjusting lever 44ª just after the link 44 has passed the dead center with the pivot of the stationary member 29 when the plows are raised and exactly in dead center with said pivot when the plows are lowered, hence effecting the disconnection of the clutch at the instant when the strain or load on its connecting elements is practically *nil*. This is of material importance in eliminating wear on the clutch parts. This construction is particularly necessary where the fulcrum of the adjusting lever is offset from the crank shafts as is the case in this plow. As soon as the roller 35 is disengaged, the cable 43 may be released and the roller 35 will ride over the track 55 or 55ª next succeeding on the relatively stationary clutch member and will then pass into engagement with the other notch 40 or 41 to throw the roller 33 out of engagement with the notches 28 so as to prevent further movement of the relatively stationary clutch member; or, in other words, to prevent accidental lowering of the plow bases into the ground.

In order to raise the rear end of the plow frame and plow bases out of the ground, a connection is provided between the rock shaft 21 and the rear carrying wheel 56, which connection includes a link 57, the front end of which is pivotally connected to an arm 37ª on the bracket 37, the rear portion of the link 57 being operatively connected to the free end of a lever 58, the other end of which is pivotally connected to the plow beam 15.

Pivoted intermediate the ends of the link 58 is a link 59 which is operatively connected through a series of links to one arm of a bell crank lever 60 which is suitably supported in a casting 61 secured to the rear end of the plow beam 15. The other arm of the bell crank lever is pivotally connected to a hollow casting 62, in which is mounted the vertical stem 63 of the support 64 for the wheel 56 which is thereby given a free swinging movement. Surrounding the upper end of the stem and located intermediate the casting 62 and a suitable nut 65 is a cushion spring 66. Suitably supporting the wheel structure at the rear is a link 67 which connects the casting 61 with the casting 62.

By means of this arrangement it is seen that when the shaft 21 is rocked for raising the front end of the plow beams and plow bases, a corresponding motion is not only transmitted to the crank shaft 53 for assisting, but owing to the lost motion occurring in straightening the two parts of link 59 the rear end of the frame is raised following the raising movement of the front end of the frame, that is to say, the front end of the plow frame is first raised and then the rear end of the plow frame is raised, or, in other words, the points of the plow bases are first raised or tilted in an upward direction and then rear ends of the plow bases are raised. The operation or the raising of the front and rear ends of the plow frame and the raising of the front and rear ends of the plow bases may be said to be successive.

The plow frame and bases are lowered mainly by their own weight when the clutch permits the action. It will be noted that the depth of the plows may be regulated by movement of the hand control levers 44ª and 52 with respect to their segments, but in the automatic movements of raising and lowering, the hand levers are locked to their co-operating segments. Suitable counterbalancing springs 67 and 68 are operatively connected respectively to the crank shafts 53 and 21 and adjustably connected with respect to the bracket 18 for assisting the raising of the plow bases and for preventing their dropping too suddenly, and for taking excessive strain off the land wheel in raising the plow bases.

By means of this arrangement a simple and compact plow is provided which is adapted to meet all the requirements for successful commercial operation.

It is apparent that there may be modifications of the invention, and it is our intention to cover all such modifications which do not involve a departure from the spirit and scope of the invention as set forth in the following claims.

What we claim as our invention and desire to secure by Letters Patent is:

1. In a plow, the combination of a frame, a plow base carried thereby, a crank shaft connected to said frame for rocking movement with respect thereto, a wheel, a power shaft connected to said wheel, and normally rotatable therewith, a bearing for the power shaft mounted on said crank shaft, a rotatable clutch member secured to said power shaft and a normally stationary clutch member coöperating with said rotatable clutch member and operatively connected to the frame and control means for said clutch whereby the frame may be raised.

2. In a plow, the combination of a frame, a plow base carried thereby, a crank shaft connected to said frame for rocking movement with respect thereto, a wheel, a power shaft connected to said wheel and normally rotatable therewith, a bearing for the power shaft mounted on said crank shaft, and manually operable clutch means connected to the power shaft for raising or lowering the frame.

3. In a plow, the combination of a frame, a plow base carried thereby, a crank shaft connected to said frame for rocking movement with respect thereto, a wheel, a power shaft connected to said wheel and normally rotatable therewith, a bearing for the power shaft mounted on said crank shaft, another crank shaft adjacent the said crank shaft substantially parallel therewith and operatively connected thereto, a wheel thereon, and manually operable clutch means connected to the power shaft for raising or lowering the frame.

4. In a power lift plow, a frame, a crank axle having a downwardly extending crank, a ground wheel on the crank arm, a trip controlled lift mechanism driven from the wheel, a pivoted trip arm in coöperative relation to the lift mechanism, an upright guide standard fixed to the crank arm, and a trip cord connected to the trip arm and passing through a guide on the upper end of the standard.

In testimony whereof we affix our signatures, in the presence of two witnesses.

ALEXUS C. LINDGREN.
ROY B. JOHNSTON.

Witnesses:
L. ALMOND,
L. C. STONER.